United States Patent
Lazaroff et al.

(10) Patent No.: US 8,032,894 B2
(45) Date of Patent: Oct. 4, 2011

(54) SERVICE BUS ARCHITECTURE

(75) Inventors: Bruce Ian Lazaroff, Manchester, CT (US); Youyi Mao, Hamden, CT (US); Sean James Hickman, East Hartford, CT (US); Peter Robert Nicholson, Langhorne, PA (US)

(73) Assignee: Aetna Inc., Hartford, CT (US)

( * ) Notice: Subject to any disclaimer, the term of this patent is extended or adjusted under 35 U.S.C. 154(b) by 948 days.

(21) Appl. No.: 11/966,736

(22) Filed: Dec. 28, 2007

(65) Prior Publication Data

US 2009/0172695 A1 Jul. 2, 2009

(51) Int. Cl.
*G06F 3/00* (2006.01)
(52) U.S. Cl. ...................................... 719/313
(58) Field of Classification Search .................. 719/315
See application file for complete search history.

(56) References Cited

U.S. PATENT DOCUMENTS

| | | | | |
|---|---|---|---|---|
| 6,430,624 B1 * | 8/2002 | Jamtgaard et al. | | 709/246 |
| 7,162,722 B1 | 1/2007 | Supinski et al. | | |
| 7,870,254 B2 * | 1/2011 | Allan | | 709/224 |
| 2004/0208164 A1 * | 10/2004 | Keenan et al. | | 370/352 |
| 2006/0235733 A1 | 10/2006 | Marks | | |
| 2007/0011126 A1 | 1/2007 | Conner et al. | | |
| 2007/0162478 A1 | 7/2007 | Hall et al. | | |
| 2007/0192706 A1 | 8/2007 | Bruce et al. | | |

OTHER PUBLICATIONS

Hedi Pan, Heads and Tails: A Vairiable-Length Instruction Format Supporting Parallel Fetch and Decode, 2001.*
Brown et al. article entitled "SOA Development Using the IBM Rational Software Development Platform: A Practical Guide" (Sep. 2005) IBM Corporation (36 pages).
Article entitled "OASIS UDDI" (Organization for the Advancement of Structured Information Standards) Leaflet "Introduction to UDDI: Important Features and Functional Concepts" (Oct. 2004) (11 pages).
Web page entitled "UDDI Version 3 Features List", obtained from the internet at uddi.org/pubs/uddi_vs_features.htm on Oct. 16, 2007 (Copyright 2000-2002) (8 pages).

* cited by examiner

*Primary Examiner* — Lechi Truong
(74) *Attorney, Agent, or Firm* — Leydig, Voit & Mayer, Ltd.

(57) ABSTRACT

In embodiments, an implementation of a service oriented architecture is provided including an application service bus capable of approximating point-to-point performance by reducing the format transformation of application messages by way of relaying them in a native format when the message format of a consumer application and/or service provider application is supported by the service bus. Preferably, the service bus is capable of supporting multiple message formats and transport protocols and comprises a plurality of components including a Service Initiator module, a Service Terminus module, a Service Locator module, and a Transport module. The service bus provides logical isolation between a consumer application and a provider application by exposing a set of interfaces for relaying service request and service response messages between the applications.

17 Claims, 4 Drawing Sheets

SERVICE BUS ARCHITECTURE

INCORPORATION-BY-REFERENCE OF MATERIAL SUBMITTED ELECTRONICALLY

Incorporated by reference in its entirety herein is a computer-readable code listing submitted concurrently herewith and identified as follows: One 24 k Byte ASCII (Text) file named "260758 ComputerProgramListingAppendix.txt," created on Dec. 28, 2007.

FIELD OF THE INVENTION

This invention relates generally to the field of enterprise management and more specifically to the area of computer application integration.

BACKGROUND OF THE INVENTION

Service Oriented Architecture (SOA) is a computer application integration architecture that is based on a concept of an application service. An application service (hereinafter "service") typically encapsulates a business function, such as processing of supplied data in accordance with a predetermined business process, and provides platform independent functionality between heterogeneous applications. The service functionality is specified via an implementation independent service interface definition, such as a Web Services Description Language (WSDL). As an example of a service, a thin client application implemented on a JavaScript platform requests user authentication and supplies user credentials to an authentication service executed by one or more server applications implemented on a COBOL platform. Thus, the service may be provided by one or more service provider applications that process the service request in accordance with their specific technology implementation and provide the results of the service execution back to a requesting, or service consumer, application per service definition. The service consumer application, in turn, may be implemented on a technology platform that is different from the service provider application. The service consumer and service provider applications are loosely coupled through the service interface while hiding the implementation details.

In some SOA implementations, services are invoked through messaging middleware that relays service messages between service consumer and service provider applications using a message transport protocol, such as SOAP. The use of messaging middleware provides flexibility in implementing and maintaining the applications interacting via a service contract by removing a direct connection that is otherwise present in a point-to-point communication between the consumer and provider applications. This results in a logical isolation of the service consumer and service provider service interfaces and further simplifies independent development. However, it also results in a performance bottleneck and, in case of proprietary middleware, reduces interoperability.

Typical messaging middleware for communicating the service messages involves using a single proprietary canonical message format for relaying messages between the service consumer and service provider applications. Such an implementation of a service bus architecture degrades performance and increases the cost by requiring frequent transformations of service message formats into a canonical service bus format in order to relay the messages between applications.

BRIEF SUMMARY OF THE INVENTION

Embodiments of the invention are used to provide a service oriented architecture via an application service bus capable of approximating point-to-point performance by reducing the format transformation of application messages by way of relaying them in a native format when a consumer application and/or service provider application provides an interface having a message format that is supported by the service bus. Preferably, the service bus is capable of supporting multiple message formats and transport protocols and comprises a plurality of components including a Service Initiator module, a Service Terminus module, a Service Locator module, and a Transport module. The service bus provides logical isolation between a consumer application and a provider application by exposing a set of interfaces for relaying service request and service response messages between the applications.

In one aspect of the invention, in a computer system for integrating a plurality of computer applications via a service oriented architecture while providing logical isolation and reducing message format transformation between the plurality of applications, a service bus is provided comprising (a) a service locator module for communicating configuration information associated with a service, the configuration information comprising a plurality of fields for identifying message data formats associated with each of the plurality of applications and with the service bus, (b) a service initiator module for forwarding a service request message from a consumer application to a service terminus module, the service terminus module forwarding the service request message to a service provider application to execute the service, (c) the service terminus module receiving a service response message from the service provider application and forwarding the service response message to the service initiator module, the service initiator module forwarding the service response message to the consumer application to provide the requested service, and (d) wherein at least one of the service initiator and the service terminus modules relay the service request and service response messages in a message data format native to at least one of the consumer and the service provider applications when the configuration information indicates that the service bus supports a message data format of at least one of the consumer application and provider application.

In another aspect of the invention, a method is provided for integrating a plurality of computer applications via a service oriented architecture while providing logical isolation and reducing message format transformation between the plurality of applications, the method comprising (a) communicating configuration information associated with a service, the configuration information comprising a plurality of fields for identifying message data formats associated with each of the plurality of applications and with a service bus, (b) forwarding a service request message from a consumer application to a service provider application via the service bus to execute the service, (c) receiving a service response message from the service provider application and forwarding the service response message to the consumer application to provide the service, and (d) relaying at least one of the service request and service response messages in their respective native message data formats when the configuration information indicates that the service bus supports a message data format of at least one of the consumer application and provider application.

In yet another aspect of the invention, a computer readable medium is provided having stored thereon instructions for integrating a plurality of computer applications via a service oriented architecture while providing logical isolation and reducing message format transformation between the plurality of applications, the instructions comprising (a) communicating configuration information associated with a service, the configuration information comprising a plurality of fields for identifying message data formats associated with each of the plurality of applications and with a service bus, (b) forwarding a service request message from a consumer application to a service provider application via the service bus to execute the service, (c) receiving a service response message from the service provider application and forwarding the service response message to the consumer application to provide the service, and (d) relaying at least one of the service request and service response messages in their respective native message data formats when the configuration information indicates that the service bus supports a message data format of at least one of the consumer application and provider application.

BRIEF DESCRIPTION OF THE DRAWINGS

While the appended claims set forth the features of the present invention with particularity, the invention and its advantages are best understood from the following detailed description taken in conjunction with the accompanying drawings, of which:

DETAILED DESCRIPTION OF THE INVENTION

The following examples further illustrate the invention but, of course, should not be construed as in any way limiting its scope.

Figure 1:
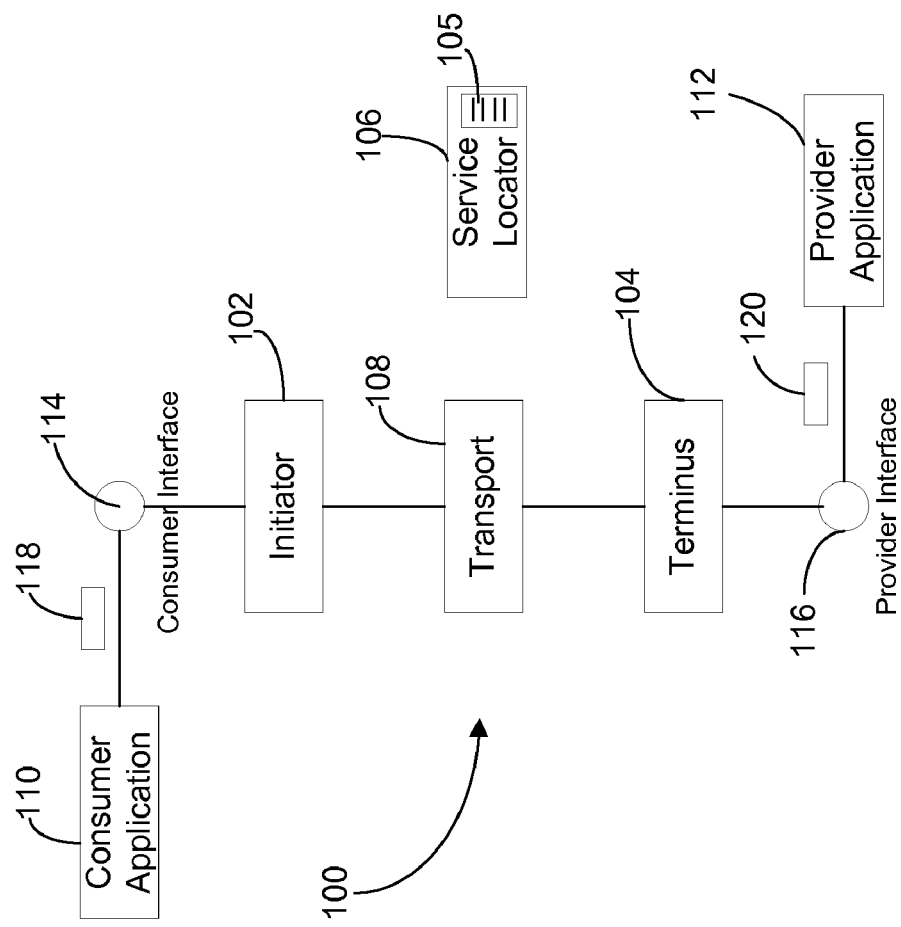
FIG. 1 is a diagram of a service oriented application environment including an application service bus capable of approximating point-to-point performance by reducing format transformation of application messages, as contemplated by an embodiment of the present invention.

Turning to FIG. 1, an implementation of a system contemplated by an embodiment of the invention is shown with respect to a service oriented application environment including an application service bus capable of approximating point-to-point performance by reducing format transformation of application messages by way of relaying them in a native format when the service bus supports a message format interface of a consumer application and/or service provider application. Preferably, the service bus 100 is capable of supporting multiple message formats and transport protocols and comprises a plurality of components including a Service Initiator module 102, a Service Terminus module 104, a Service Locator module 106, and a Transport module 108. In an embodiment, to further enhance interoperability, the message formats supported by the service bus 100 are nonproprietary. The modules 102-108 of the service bus 100 are implemented as computer executable instructions stored in memory of one or more computers comprising an enterprise computer system. In one embodiment, the enterprise computer system hosts a plurality of health insurance applications. The service bus 100 provides logical isolation between a consumer application 110 and provider application 112 by exposing a set of interfaces 114, 116 for relaying service request and service response messages between the consumer and provider applications.

To provide an "on-ramp" to the service bus 100, the Service Initiator module 102 interfaces with the consumer application 110 to forward a service request message 118 to the provider application 112 via the Transport module 108 and the Service Terminus module 104. Upon invoking the execution of the requested service, the provider application 112 returns a service response message 120 to the consumer application 110 via the Transport module 108 by interfacing with the Service Terminus module 104. The Service Initiator and Service Terminus modules 102, 104 call the Service Locator module 106 to ascertain configuration information 105 in the course of forwarding the service request and response messages 118, 120. To this end, the Service Locator module 106 stores configuration information 105 as metadata that is used to determine supported message formats, message routing (e.g., IP or URL addresses), message compression (e.g., no compression, zip, gzip), and message body encoding (e.g., plain, Base64) associated with the service request and service response messages 118, 120. The configuration information 105 also includes metadata fields corresponding to the message formats recognized by the service bus 100, one or more transport types supported by the service bus (e.g., SOAP over HTTP, Message Queue), and any transport mediations necessary to optimize the flow of information on the service bus 100. Preferably, the configuration information 105 further includes metadata fields corresponding to versioning information for specifying which version of requested service to execute.

Preferably, the service bus 100 uses a message envelope wrapper pattern to include a unified message header with all service bus messages. The unified message header includes header keys identifying service-specific configuration information 105 at the Service Locator module 106, including command and control data, such as message routing.

In one embodiment, message formats native to the interfaces of the consumer application 110, provider application 112, and service bus 100 include XML, Copybook (CPY), and Fixed Length String Data, however other message formats used in the context of service oriented architecture (SOA) may be applicable. As described in further detail below, the Service Initiator and Service Terminus modules 102, 104 use the configuration information 105 to determine message format compatibility and to decide whether to transform the message envelope and header of the service request and service response messages 118, 120 between message formats of the endpoint applications 110, 112 and of the service bus 100.

To further approximate point-to-point message performance, the Service Initiator and Service Terminus modules 102, 104 preferably cache configuration information 105 previously retrieved from the Service Locator module 106. This reduces the message payload along the service bus 100 during subsequent service requests by the consumer application 110. Therefore, the Service Initiator and Service Terminus modules 102, 104 initially check their local cache for configuration information in the process of forwarding the service request and service response messages 118, 120 via the Transport Module 108. The Service Initiator module 102 and Service Terminus module 104 locate the necessary configuration information 105 based on a set of keys in a message header of the service request and service response messages 118, 120. If the configuration information 105 is not available at their respective local cache, the Initiator 102 and/or Terminus 104 calls the Service Locator module 106 to obtain the configuration information 105 by matching the message header keys with the configuration information stored at the Service Locator module. In this case, the calling module 102, 104 adds retrieved configuration information 105 to its local cache to avoid future calls to the Service Locator module 106, thereby reducing the future messaging payload.

Figure 2:
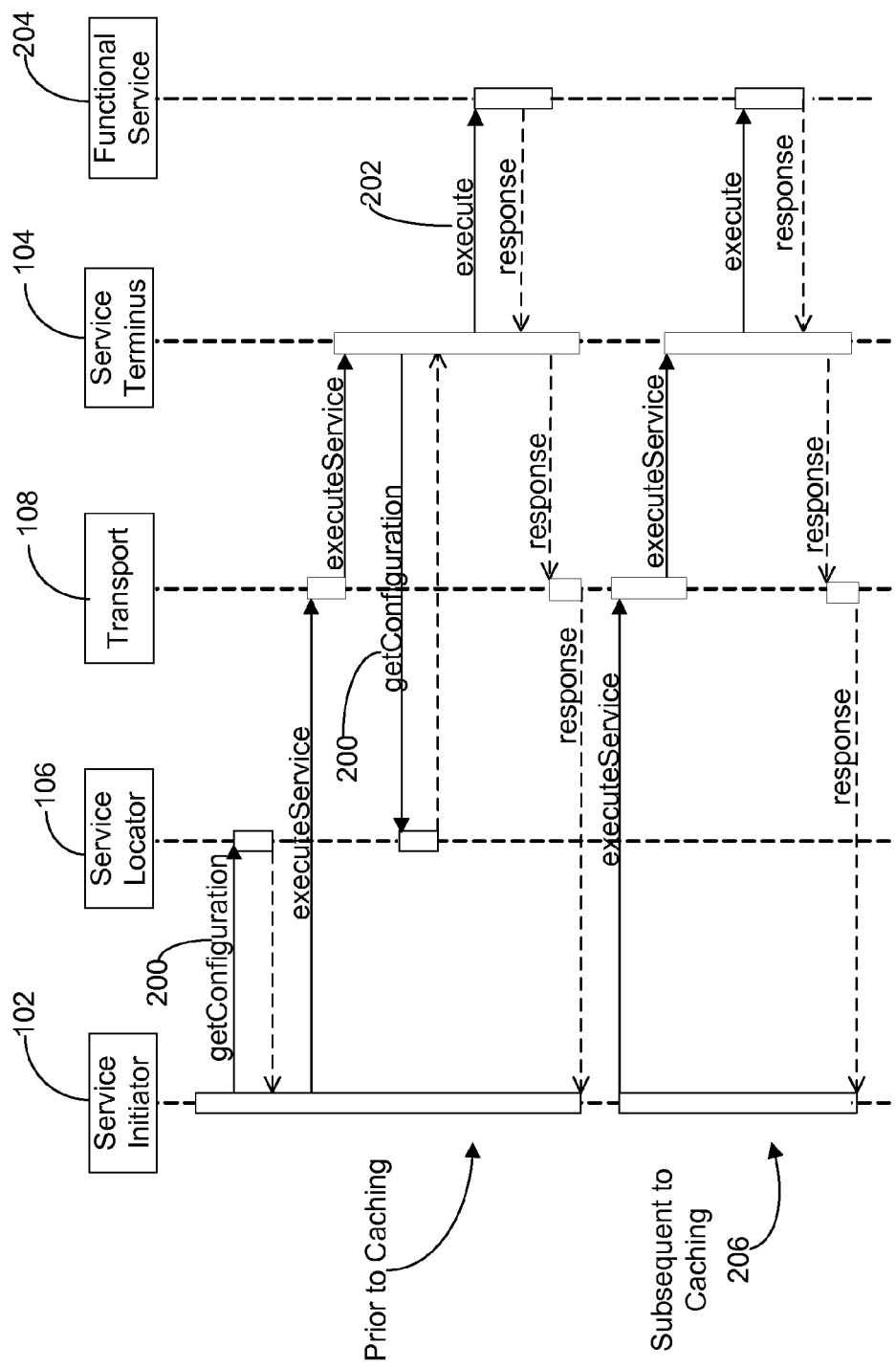
FIG. 2 is a message sequence diagram illustrating service response and service request messaging between the components of the service bus of FIG. 1, as contemplated by an embodiment of the present invention.

As illustrated in an embodiment of a message sequence of FIG. 2, when configuration information 105 is not available at the local cache, the Service Initiator module 102 invokes a getConfiguration method 200 at the Service Locator module 106 to receive the configuration data based on the service request message header keys. Upon receipt of configuration data 105, the Initiator 102 stores it in its local cache memory to avoid future calls to the Service Locator 106. In one embodiment, the Service Initiator 102 forwards the configuration information 105 to the Service Terminus 104 together with the service request message 118 in order to eliminate the need to again interrogate the Service Locator 106 when the service request message 118 arrives at the Service Terminus 104. The Service Initiator 102 locates the configuration information 105 based on message header keys that include consumer id, consumer version, service name, and service interface (i.e., message format) fields.

If, based on the configuration information 105, the message format of the consumer application 110 is supported by the bus 100, the Initiator module 102 forwards the service request message 118 to the Terminus 104, via the Transport module 108, in its native format (after performing message encoding and/or compression, if any, as specified in the configuration information 105). Otherwise, the Service Initiator module 102 transforms the request message envelope and request message header from a consumer application format (e.g., HTML) to a bus-recognized message format (e.g., CPY or XML), performs any necessary message body encoding and/or compression, and forwards it on to the Terminus 104 via the Transport module 108. Preferably, while the message envelop and message header are transformed to a bus-recognized message format, the message format body is left unchanged to reduce additional transformation and further approximate point-to-point messaging.

Similarly, when the Service Terminus 104 is unable to find the service request message header keys in its local cache memory, it invokes a getConfiguration method 200 at the Service Locator 106 to obtain the configuration information 105, including the message format of the provider application 112, and write it to its cache memory for subsequent use. If the provider application's message format is that of the received service request message 118, the Terminus 104 forwards it to the provider application 112 in its native format to execute 202 the requested service 204. Otherwise, the Terminus 104 first transforms the service request message envelope and header to a message format recognized by the provider application 112. The Service Terminus module 104 also performs any necessary service request message decompression and/or decryption. Subsequent service requests 206 from the same consumer application 110 are processed in accordance with the configuration data 105 stored in respective cache memories of the Initiator 102 and Terminus 104.

The message mediation process is repeated in reverse order with respect to a service response message 120. That is, the Service Terminus module 104 encrypts and/or compresses the service request message 120 in accordance with the configuration information 105; if necessary, performs format transformation of the message envelope and message header (format of the message body is left unchanged) between the provider application format and service bus recognized formats, and forwards the service response message 120 back to the Service Initiator 106 via the Transport module 108. The Service Initiator 106, in turn, decompresses and/or decrypts the message 120; if necessary, performs message format transformation of the response message envelope and header from a bus-recognized message format to the consumer application's format, and forwards the response message 120 to the consumer application 110.

Therefore, unnecessary message format transformation is avoided when consumer and/or provider application message formats are among a plurality of message formats supported by the service bus 100. Furthermore, when the consumer application message format is supported by the service bus 100 and is identical to that of the provider application 112, the service request and service response messages 118, 120 are relayed without format transformation, thereby emulating point-to-point messaging without losing logical isolation between consumer and provider applications.

In a preferred embodiment, message format transformation is controlled by the format of the service provider application 112 when its message format is supported by the service bus 100. In this case, the Service Initiator module 102 checks whether configuration information 105 indicates that the message format of the consumer application 110 is different from that of the provider application 112. If so, the Service Initiator module 102 converts the header and envelope of the service request message 118 into a service bus-recognized format that is native to the provider application 112 and forwards the transformed service request message 118 along the service bus 100 to the Service Terminus module 104. If, however, the message format of the consumer application 110 matches that of the provider application 112, the Service Initiator module 102 forwards the service request message 118 in its native format. The Service Terminus module 104, in turn, forwards the service request message 118 by interfacing with the provider application 112 to invoke execution of the requested service. The Service Terminus module 104 foregoes mediation of message formats since the service request message 118 conforms to the data format of the provider application 112. When the provider application 112 executes the requested service, it generates a service response message 120 and message sequence is repeated in reverse order.

Figure 3:
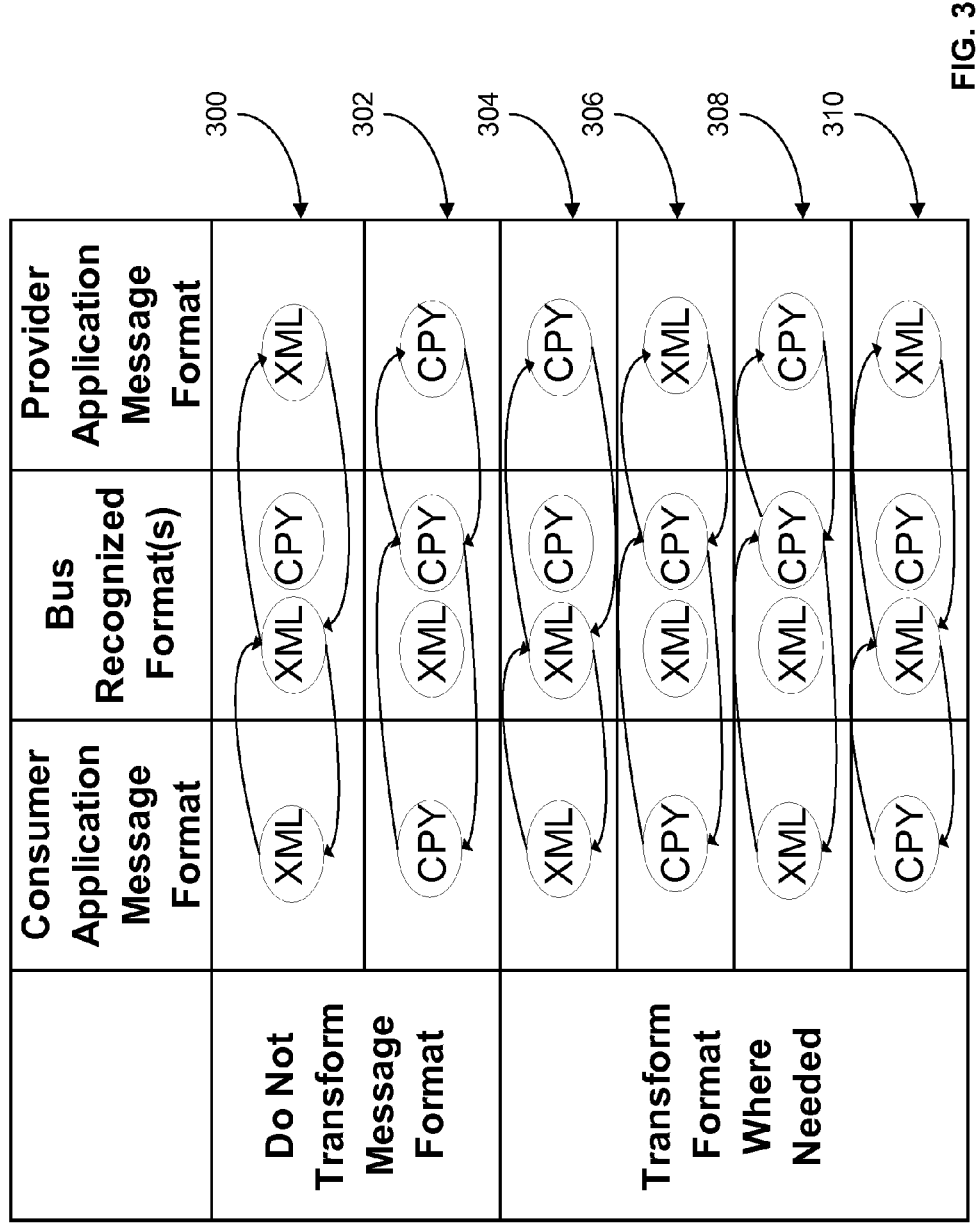
FIG. 3 is a table of state diagrams representing exemplary scenarios where message format transformation of service request and service response message headers and message envelopes is fully or partially avoided, as contemplated by an embodiment of the present invention.

Turning to FIG. 3, embodiments of message format transformation sequences are illustrated by way of a table of state diagrams representing exemplary scenarios where message format transformation of service request and service response message headers and message envelopes is fully or partially avoided. In these examples, the service bus 100 supports both XML and CPY message formats, while consumer application 110 and provider application 112 each support either XML or CPY messages. Message format state diagrams 300-302 illustrate native format messaging when consumer and provider applications 110, 112 have identical message formats (XML or CPY) that are supported by the service bus 100.

Message format state diagrams 304-310, on the other hand, illustrate embodiments where the consumer and provider applications 110, 112 support different message formats. For example, while a consumer application 110 supports XML messages, the provider application 112 natively supports CPY messages, or vice versa. In these embodiments, the Service Initiator module 102 or the Service Terminus module 104 transform the message headers and message envelopes where needed. Specifically, message format state diagrams 304-306 represent embodiments where the Service Initiator module 102 forwards the service request messages 118 in a native format (e.g., XML-to-XML, or CPY-to-CPY), while the Service Terminus module 104 transforms the message format to that of the provider application 112 (e.g., XML-to-CPY, or CPY-to-XML). Terminus module 104 subsequently returns the service response messages 120 from the provider application 112 in a provider application format (e.g., CPY or XML), while the Initiator 102 transforms the response message format to that of the consumer application 110 (e.g., XML-to-CPY, or CPY-to-XML). Alternatively, the Terminus 104 performs format transformation of service response messages 120 into consumer application format, while the Initiator 102 forwards response messages 120 without format transformation. Finally, state diagrams 308-310 represent embodiments where the Service Initiator 102 first transforms the service request messages 118 into provider application's message format (e.g., XML-to-CPY, or CPY-to-XML), while the Service Terminus 104 passes the service request messages 118 to the provider application 112 without format transformation. On the response path, the Service Terminus module 104 forwards the service response messages 120 to the Service Initiator module 102 without format transformation (e.g., CPY-to-CPY, or XML-to-XML), while the Service Initiator 102 transforms the service response messages (i.e., the message envelope and header) into consumer application message format (e.g., CPY-to-XML, or XML-to-CPY).

Figure 4:
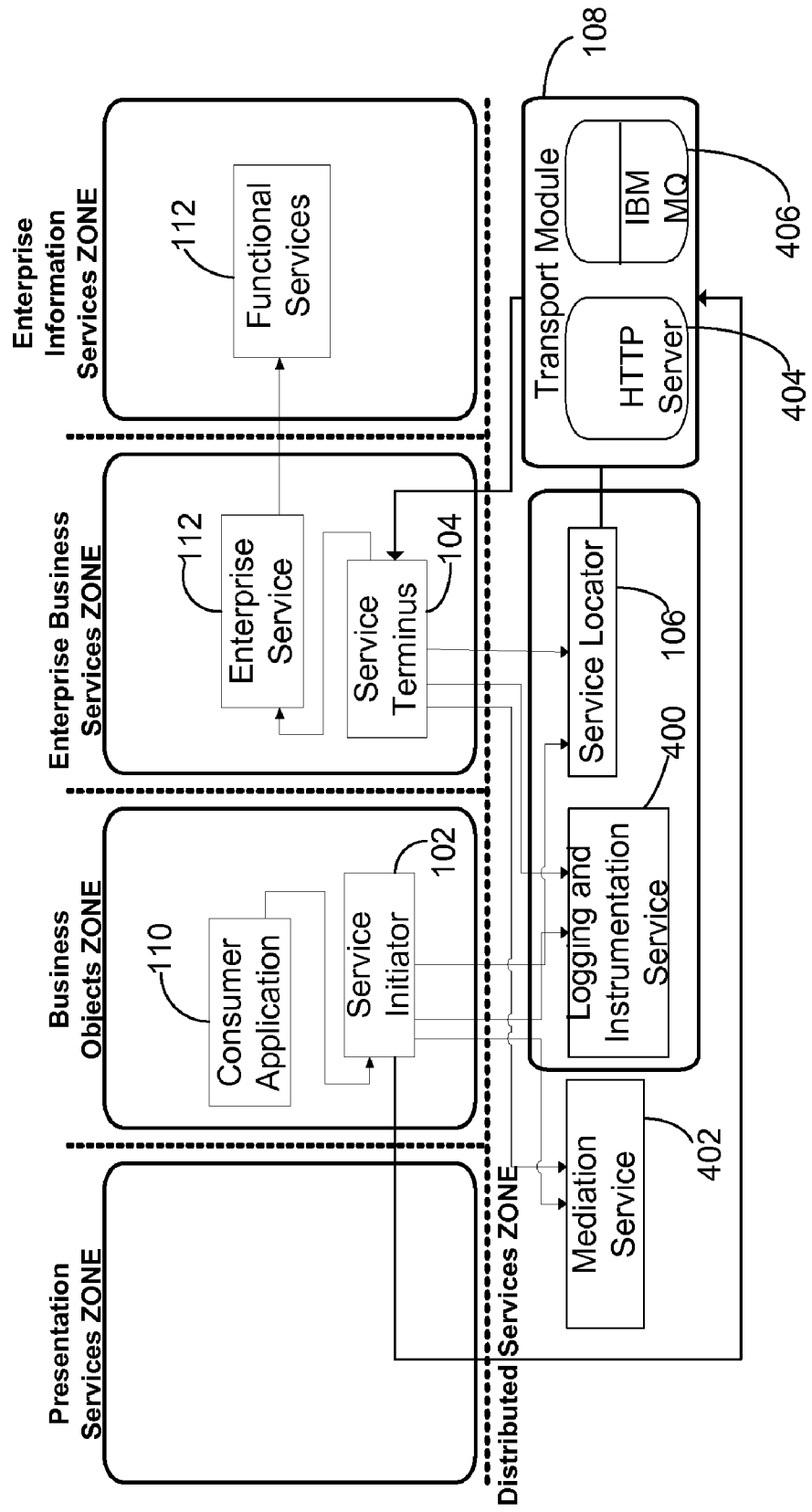
FIG. 4 is a diagram illustrating an implementation of the service oriented architecture of FIG. 1 in more detail, in accordance with an embodiment of the invention.

Turning to FIG. 4, an implementation of the service oriented architecture of FIG. 1 is shown in more detail. In addition to the service bus components described above, the system includes a logging and instrumentation service 400 for logging performance parameters and error messages, or exceptions, encountered in connection with message transformation and transport. In an embodiment, the logging and instrumentation service 400 executes on a Customer Information Control System (CICS) transaction server.

When the service bus 100 is implemented on a Java platform, the consumer application 110 receives error messages via an ESBException class, and its subclasses. This class provides a high-level description of the problem along with any available detailed information. For example, if an internal component of the Service Initiator module 102 throws an exception, it is wrapped inside the ESBException. This allows the consumer application 110 to respond to a wide variety of problem conditions at a generic level, while still having access to the details of the problem. Further messages returned from the bus 100 contain error information embedded in the message headers.

Transformation and mediation requests from the Service Initiator module 102 and Service Terminus module 104 are handled by the mediation service 402. In an embodiment, the mediation service 402 is hosted by an application server, such as an IBM Websphere™ Application Server.

The Transport module 108 relays the service request and service response messages 118, 120 between the Initiator and Terminus modules 102, 104 via one of the plurality of available transport methods, including an HTTP server 404 for SOAP over HTTP transport, as well as an IBM Websphere™ Message Queue (MQ) 406. Alternatively or in addition, request and response messages 118, 120 are relayed using SOAP over Java Message Service (JMS) and/or XML over HTTP transports. In a CICS implementation of the service bus 100, the Transport module 108 supports Channels and Containers, as well as direct memory to memory transfer technologies. Exemplary XML message definitions for an IBM WebSphere™ implementation of the service request and service response messages 118, 120, as well as Service Locator schemas, are included in the Computer Program Listing Appendix, which is incorporated herein by reference in its entirety.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. In a computer system for providing logical isolation and reducing message format transformation between a plurality of computer applications, a service bus comprising:

computer readable memory having stored thereon computer executable instructions for integrating the plurality of computer applications via a service oriented computer architecture;

a service locator module for communicating configuration information associated with a service, the configuration information comprising a plurality of fields for identifying message data formats associated with each of the plurality of applications and with the service bus;

a service initiator module for forwarding a service request message from a consumer application to a service terminus module, the service terminus module forwarding the service request message to a service provider application to execute the service; and the service terminus module receiving a service response message from the service provider application and forwarding the service response message to the service initiator module, the service initiator module forwarding the service response message to the consumer application to provide the requested service;

wherein at least one of the service initiator and the service terminus modules relay the service request and service response messages in a message data format native to at least one of the consumer and the service provider applications when the configuration information indicates that the service bus supports a message data format of at least one of the consumer application and the service provider application, the service request and the service response messages comprising a unified header including command and control information, the unified header comprising at least one header key identifying the configuration information at the service locator module.

2. The computer system of claim 1 further comprising a transport module for communicating the service request message and the service response message between the service initiator module and the service terminus module via a transport technology.

3. The computer system of claim 2 wherein the transport technology is selected from the group consisting of a message queuing protocol, SOAP over HTTP, SOAP over Java Message Service, XML over HTTP, Channels and Containers, and direct memory to memory transfer.

4. The computer system of claim 1 wherein the message data format of the service bus comprises one or more of an XML format and a Copybook format.

5. The computer system of claim 1 wherein the configuration information further comprises one or more of a message routing field, a transport protocol field, a message compression field, a message encryption field, a consumer application version field, and an instrumentation field.

6. The computer system of claim 1 wherein the service initiator and the service terminus modules are capable of caching the configuration information to reduce message payload along the service bus during subsequent service requests by the consumer application.

7. A method for integrating a plurality of computer applications via a service oriented computer architecture while providing logical isolation and reducing message format transformation between the plurality of applications, the method comprising:
  communicating configuration information associated with a service, the configuration information comprising a plurality of fields for identifying message data formats associated with each of the plurality of applications and with a service bus;
  forwarding a service request message from a consumer application to a service provider application via the service bus to execute the service;
  receiving a service response message from the service provider application and forwarding the service response message to the consumer application to provide the service; and
  relaying at least one of the service request and service response messages in their respective native message data formats to at least one of the consumer and the service provider application when the configuration information indicates that the service bus supports a message data format of at least one of the consumer application and the service provider application;
  wherein the service request and the service response messages comprise a unified header including command and control information, the unified header comprising at least one header key for identifying the configuration information.

8. The method of claim 7 further comprising communicating the service request message and the service response message via a transport technology employed by the service bus.

9. The method of claim 8 wherein the transport technology is selected from the group consisting of message queuing, SOAP over HTTP, SOAP over Java Message Service, XML over HTTP, Channels and Containers, and direct memory to memory transfer.

10. The method of claim 7 wherein the message data format of the service bus comprises one or more of an XML format and a Copybook format.

11. The method of claim 7 wherein the configuration information further comprises one or more of a message routing field, a transport protocol field, a message compression field, a message encryption field, a consumer application version field, and an instrumentation field.

12. The method of claim 7 further comprising caching the configuration information to reduce message payload along the service bus during subsequent service requests by the consumer application.

13. A computer readable memory having stored thereon computer executable instructions for integrating a plurality of computer applications via a service oriented architecture while providing logical isolation and reducing message format transformation between the plurality of applications, the instructions comprising:
  communicating configuration information associated with a service, the configuration information comprising a plurality of fields for identifying message data formats associated with each of the plurality of applications and with a service bus;
  forwarding a service request message from a consumer application to a service provider application via the service bus to execute the service;
  receiving a service response message from the service provider application and forwarding the service response message to the consumer application to provide the service; and
  relaying at least one of the service request and service response messages in their respective native message data formats to at least one of the consumer and the service provider application when the configuration information indicates that the service bus supports a message data format of at least one of the consumer application and the service provider application;
  wherein the service request and the service response messages comprise a unified header including command and control information, the unified header comprising at least one header key for identifying the configuration information.

14. The computer readable memory of claim 13 wherein the instructions further comprise communicating the service request message and the service response message via a transport technology employed by the service bus, the transport technology selected from the group consisting of message queuing, SOAP over HTTP, SOAP over Java Message Service, XML over HTTP, Channels and Containers, and direct memory to memory transfer.

15. The computer readable memory of claim 13 wherein the message data format of the service bus comprises one or more of an XML format and a Copybook format.

16. The computer readable memory of claim 13 wherein the configuration information further comprises one or more of a message routing field, a transport protocol field, a message compression field, a message encryption field, a consumer application version field, and an instrumentation field.

17. The computer readable memory of claim 13 wherein the instructions further comprise caching the configuration information to reduce message payload along the service bus during subsequent service requests by the consumer application.

* * * * *